United States Patent [19]

Tsuchiya

[11] Patent Number: 5,711,250
[45] Date of Patent: Jan. 27, 1998

[54] DEVICE FOR RAISING AQUARIUM FISH AND ITS RECEPTACLE ASSEMBLY

[75] Inventor: Toshihiro Tsuchiya, Kashiwa, Japan

[73] Assignee: Nisso Industry Co., Ltd., Tokyo, Japan

[21] Appl. No.: 561,398

[22] Filed: Nov. 21, 1995

Related U.S. Application Data

[62] Division of Ser. No. 210,282, Mar. 18, 1994, Pat. No. 5,501,614.

[30] Foreign Application Priority Data

Mar. 19, 1993 [JP] Japan ...................................... 5-18156

[51] Int. Cl.$^6$ ................................................ A01K 63/06
[52] U.S. Cl. .............................................. 119/259; 119/266
[58] Field of Search ................................ 119/259, 265, 119/266, 267

[56] References Cited

U.S. PATENT DOCUMENTS

| | | | |
|---|---|---|---|
| 3,125,065 | 3/1964 | Willinger | 119/266 |
| 3,828,176 | 8/1974 | Goldman et al. | 119/267 X |

FOREIGN PATENT DOCUMENTS

| | | | |
|---|---|---|---|
| 2226940 | 7/1990 | United Kingdom | 119/266 |

Primary Examiner—Robert P. Swiatek
Attorney, Agent, or Firm—Oblon, Spivak, McClelland, Maier & Neustadt, P.C.

[57] ABSTRACT

A device for raising aquarium fish is a combination of a water tank and a receptacle assembly. The water tank has an upper opening, a lid for closing the upper opening and provided with an illumination mechanism and a filtration mechanism, and a fastening portion. The receptacle assembly is for supplying electricity to the illumination and filtration mechanisms and has a fastened portion for engagement with the fastening portion of the water tank. The receptacle assembly includes an assembly body having an open side facing downward, accommodating a plurality of electric plug recieving receptacles therein and having a receptacle cover disposed inside the assembly body at a position spaced a predetermined distance from the open side of the assembly body for positioning and fixing the plurality of receptacles, and an assembly holder having a lateral wall portion attached to the assembly body and a vertical wall portion extending from the lateral wall portion and parallel to the direction faced by the open side of the assembly body at a distance from the assembly body.

2 Claims, 3 Drawing Sheets

FIG. 3
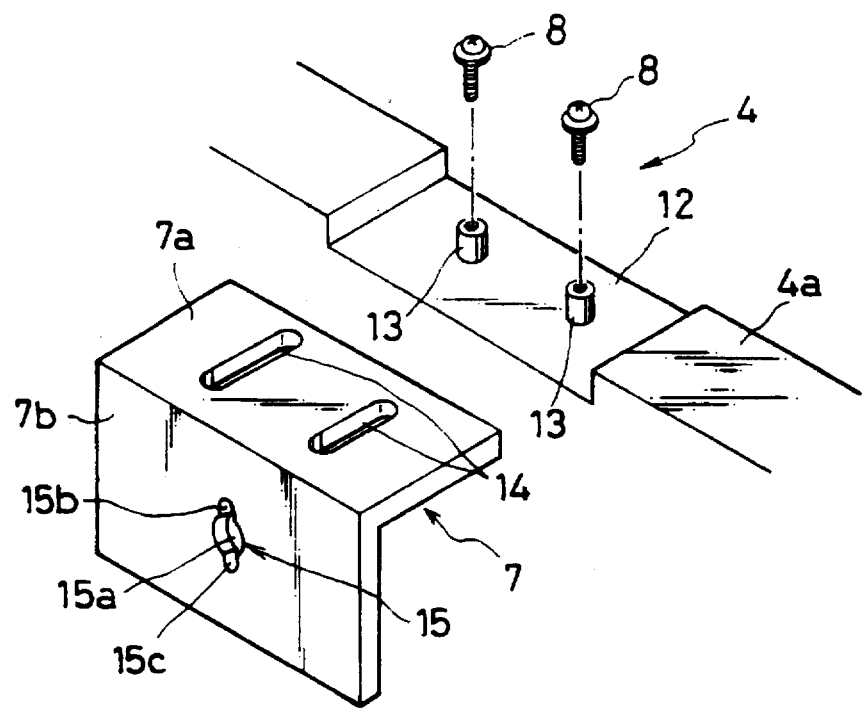
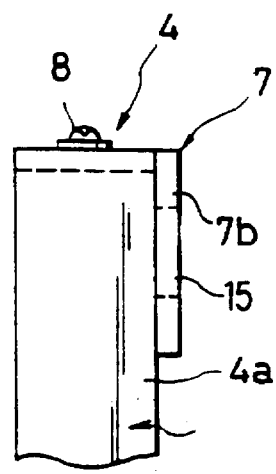
FIG. 4A
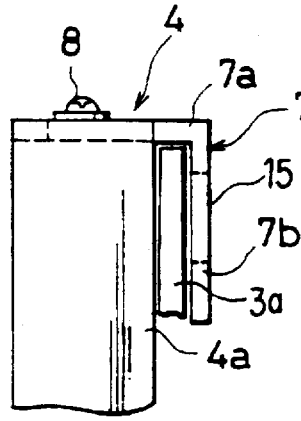
FIG. 4B
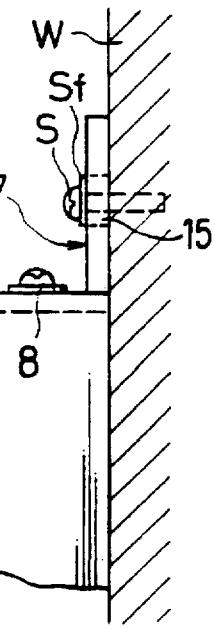
FIG. 4C

DEVICE FOR RAISING AQUARIUM FISH AND ITS RECEPTACLE ASSEMBLY

This is a Division of application Ser. No. 08/210,282 filed on Mar. 18, 1994, now U.S. Pat. No. 5,501,614.

BACKGROUND OF THE INVENTION

1. Field of the Invention

The present invention relates to a device for raising aquarium fish, including tropical fish, and to a receptacle assembly for the device.

2. Description of the Prior Art

Generally, conventional devices for raising aquarium fish comprise a water tank having an upper opening, a lid for covering the upper opening of the water tank, an illumination mechanism and a filtration mechanism. Two such mechanisms are provided on the lid or used in cooperation with each other as a lid, and supplied with electricity via their respective electric cords connected through plugs to a wall socket having its slots directed sideways or a floor socket having its slots directed upward. Since the electric cords extend to the wall or floor socket, they detract from the appearance of the water tank surroundings. Furthermore, since the wall or floor socket is disposed in the vicinity of the water tank, with its slots directed sideways or upward, there is a possibility of water drops splashing or falling from the water tank or the owner's hands onto the socket when the lid is opened for feeding the aquarium fish or during cleaning of the water tank. This may cause a short circuit.

The present invention has been proposed to solve the problems mentioned above.

One object of the present invention is to provide a device for raising aquarium fish, which makes its surroundings neat and protects it from short circuiting by water.

Another object of the present invention is to provide a receptacle assembly for the device, which enables prevention of short circuiting by water.

SUMMARY OF THE INVENTION

To attain the objects, according to the present invention there is provided a device for raising aquarium fish, comprising a combination of a water tank and a receptacle assembly, the water tank having an upper opening, a lid for closing the upper opening and provided with an illumination mechanism and a filtration mechanism, and a fastening portion, the receptacle assembly being for supplying electricity to the illumination and filtration mechanisms and having a fastened portion for engagement with the fastening portion of the water tank. There is also provided a receptacle assembly for an aquarium fish raising device comprising an assembly body open at one side, accommodating a plurality of receptacles therein and having a receptacle cover disposed inside the assembly body at a position spaced a predetermined distance from the open side of the assembly body for positioning and fixing the plurality of receptacles, and an assembly holder having a lateral wall portion attached to the assembly body and a vertical wall portion extending from the lateral wall portion toward the open side of the assembly body at a distance from the assembly body.

The above and other objects, features and advantages of the present invention will become more apparent to those skilled in the art from the description given hereinbelow with reference to the accompanying drawings.

BRIEF EXPLANATION OF THE DRAWINGS

FIG. 3 is a perspective view showing a principal part of the receptacle assembly.

FIG. 4(a) is an explanatory view showing one way of using an assembly holder.

FIG. 4(b) is an explanatory view showing another way of using the assembly holder.

FIG. 4(c) is an explanatory view showing still another way of using the assembly holder.

DETAILED DESCRIPTION OF THE PREFERRED EMBODIMENTS

The present invention will now be described in detail with reference to the illustrated embodiments.

Figure 1:
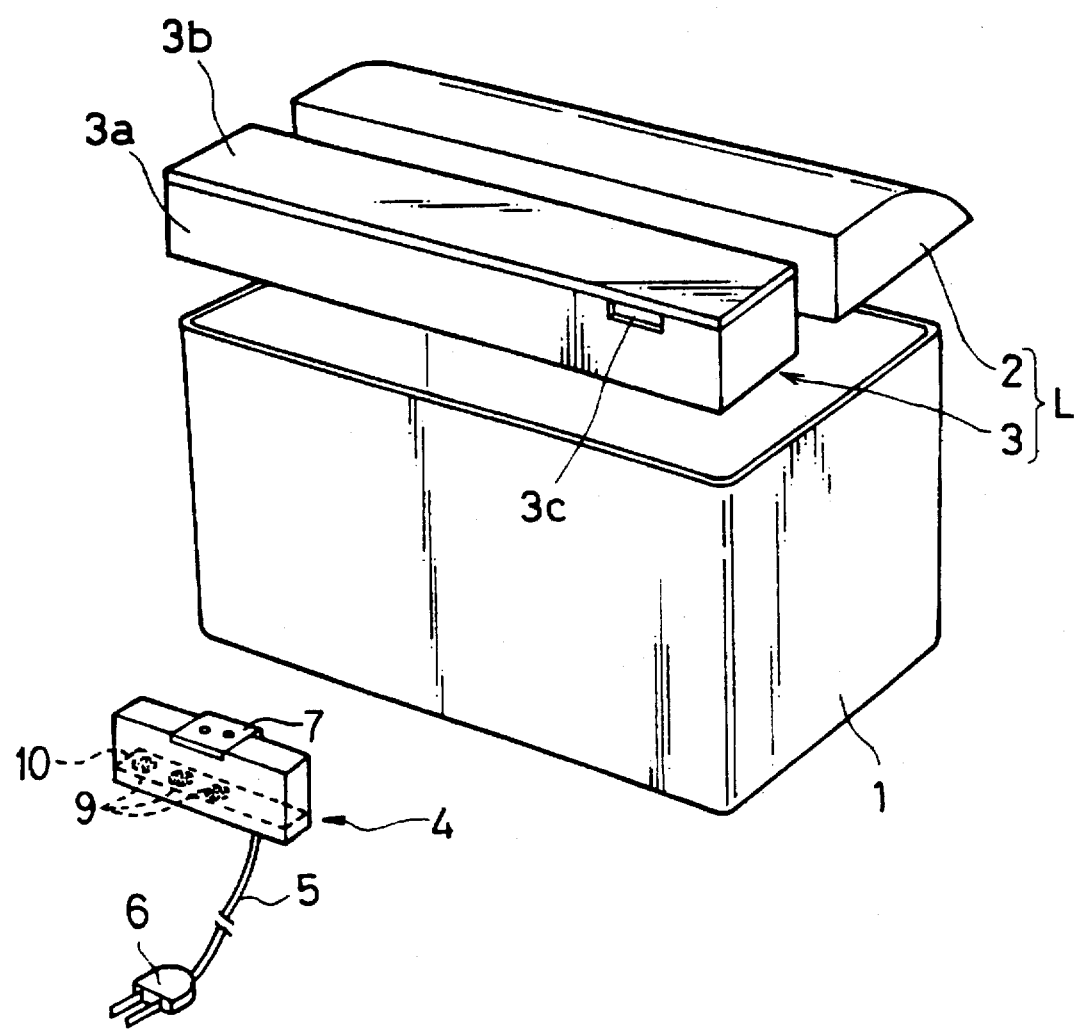
FIG. 1 is an exploded schematic perspective view showing one embodiment of a device for raising aquarium fish according to the present invention, seen from behind.

As shown in FIG. 1, a device for raising aquarium fish according to the present invention comprises a water tank 1 having an upper opening, a lid L for covering the upper opening and consisting of an illumination mechanism housing 2 provided on the lower surface thereof with a fluorescent lamp (not shown) and a filtration mechanism housing 3 for filtering water, and a receptacle assembly 4. The filtration mechanism housing 3 includes a housing body 3a accommodating a filtration mechanism (not shown) therein and a lid member 3b for covering the upper opening of the housing body 3a. The illumination mechanism housing 2 and filtration mechanism housing 3 are disposed so that they cover the front side and rear side, respectively, of the upper opening of the water tank 1. The back upper portion of the housing body 3a of the filtration mechanism housing 3 accommodates therein a pump etc. (not shown) and has a notch 3c which serves as a fastening portion described later and through which electric cords (not shown) for the two housings 2 and 3 are led out. From the lower surface of the housing body 3a of the filtration mechanism housing 3, pipes and a strainer (not shown) project downward. The receptacle assembly 4 has an electric cord 5 passing out from the open side thereof and a plug 6 connected to the leading end of the electric cord 5.

Figure 2:
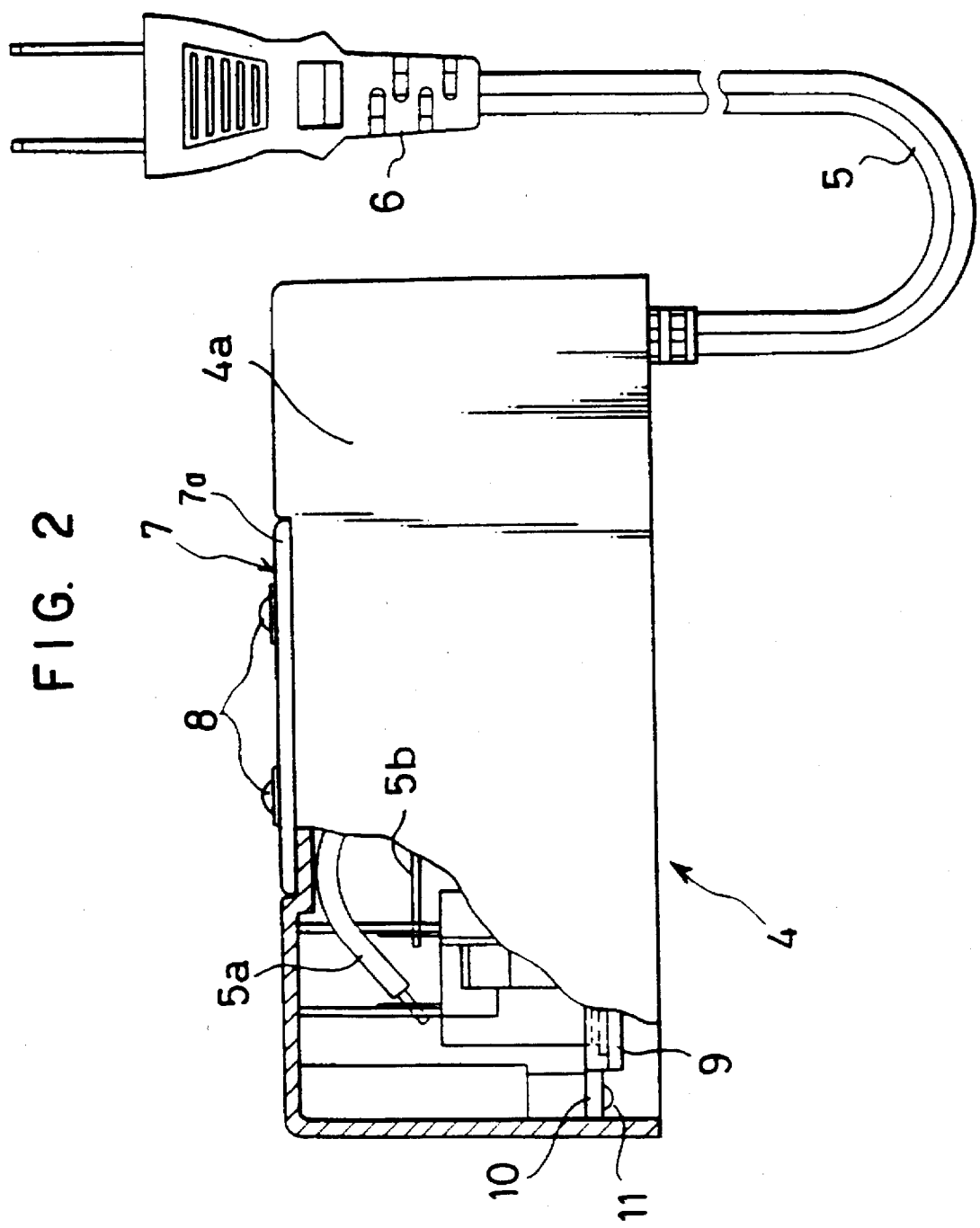
FIG. 2 is a partially cutaway front view showing a receptacle assembly according to the present invention.

As shown in FIG. 2, the receptacle assembly 4 comprises an assembly body 4a open at one side (on the bottom side in the illustrated embodiment), an assembly holder 7 fastened to the assembly body 4a by means of flanged screws 8 and serving as a fastened portion described later, a plurality of receptacles 9 accommodated in the assembly body 4a and connected to the electric cord 5 through lead wires 5a and 5b, and a receptacle cover 10 fixed by screws 11 to the inside of the assembly body 4a at a prescribed depth from the open side of the assembly body 4a for positioning and fixing the receptacles 9 within the assembly body 4a.

As shown in FIG. 3, the assembly holder 7 comprises a lateral wall portion 7a having two oblong holes 14 and a vertical wall portion 7b extending normal to the lateral wall portion 7a and having a central fastening hole 15 and has a substantially L-shaped cross section as a whole. The fastening hole 15 of the vertical wall portion 7b of the assembly holder 7 comprises a circular hole 15a and two vertical holes 15b, and 15c extending to the circular hole 15a and having a width smaller than the diameter of the circular hole 15a. On the other hand, the receptacle body 4a is provided on the side opposite the open side with a recess 12 having a depth substantially the same as the thickness of the lateral wall portion 7a of the assembly holder 7 and a width generally the same as that of the lateral wall portion 7a and with two bosses 13 rising from the recess 12 and having a height substantially the same as the thickness of the lateral wall portion 7a. The bosses 13 on the recess 12 of the assembly body 4a are inserted into the oblong holes 14 of the assembly holder 7 and the flanged screws 8 are then screwed in the bosses 13 so that the assembly holder 7 is attached to the assembly body 4a slidably on the recess 12 within the range of the length of the oblong holes 14.

The assembly holder 7 is slidably attached to the assembly body 4a by means of the flanged screws 8 in cooperation with the bosses 13 and oblong holes 14. Therefore, the vertical wall portion 7b of the assembly holder 7 can be in contact with or spaced from the assembly body 4a of the receptacle assembly 4 as shown in FIGS. 4(a) and 4(b), respectively. The receptacle assembly 4 in the state shown in FIG. 4(b) can be fixed to the filtration mechanism housing 3 (as represented in FIG. 4B) at a prescribed position by inserting the vertical wall portion 7b of the assembly holder 7 into the notch 3c from which the electric cords (not shown) for the two housings 2 and 3 pass out and fastening the assembly holder 7 in the notch 3c.

FIG. 4(c) shows the receptacle assembly used in a different manner in which the assembly body 4a is attached through the assembly holder 7 to a wall W into which a screw S with a flange Sf has been screwed. The distance between the wall W and the flange Sf is substantially the same as the thickness of the vertical wall portion 7b of the assembly holder 7. In this case, the assembly holder 7 is provided on the assembly body 4a, with the direction of the vertical wall portion 7b changed from the direction thereof shown in FIGS. 4(a) and 4(b), and the screw S is inserted from the circular hole 15a into the vertical hole 15c of the fastening hole 15. The receptacle assembly 4 shown in FIG. 4(b) can attached to the wall W by inserting the screw S from the circular hole 15a into the vertical hole 15b, of the fastening hole 15.

As has been described in the foregoing, according to the present invention since the receptacle assembly can be positioned and fastened on the filtration mechanism housing on the back side of the water tank by the assembly holder, the surroundings of the water tank become neat and the receptacle assembly is put out of sight. Furthermore, since the receptacles are directed downward and enclosed by the assembly body of the receptacle assembly, they are protected from water and prevented from short circuiting by water.

Since the assembly holder is slidably attached to the assembly body, the adjustment of the distance between the assembly body and the vertical wall portion of the assembly holder enables attachment of the receptacle assembly to filtration mechanism housing bodies of different thicknesses. Since the vertical wall portion of the assembly holder has the fastening hole, the receptacle assembly can be mounted at a place other than the device for raising aquarium fish.

While the illumination mechanism housing and filtration mechanism housing constituting the lid for the water tank in cooperation with each other are separate housings in the illustrated embodiment, they may be made integral. While the assembly holder is slidably attached to the assembly body in the illustrated embodiment, it may be stationarily attached thereto. While the notch is formed in the filtration mechanism housing in the illustrated embodiment, it may be formed in the illumination mechanism housing or in an upper part of the water tank. While the notch and assembly holder serve respectively as the fastening portion and as the fastened portion in the illustrated embodiment, the fastening and fastened portions may be any means having a relation complementary to each other.

What is claimed is:

1. A device for raising aquarium fish, comprising a combination of a water tank and a receptacle assembly;

said water tank having an upper opening and a lid for closing the upper opening, said lid comprising a front housing, an illumination mechanism in the front housing, a rear housing having a housing body, a filtration mechanism in the rear housing and a fastening portion formed on the housing body of the rear housing;

said receptacle assembly supplying electricity to the illumination mechanism and the filtration mechanism and having a fastened portion detachably engageable with said fastening portion of said lid.

2. A device for raising aquarium fish according to claim 1, wherein said fastening portion is a notch.

* * * * *